United States Patent
Sano

(10) Patent No.: US 8,062,714 B2
(45) Date of Patent: Nov. 22, 2011

(54) METHOD FOR MANUFACTURING FILM FORMATION MEMBER

(75) Inventor: Junichi Sano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 12/535,906

(22) Filed: Aug. 5, 2009

(65) Prior Publication Data

US 2010/0237534 A1    Sep. 23, 2010

(30) Foreign Application Priority Data

Aug. 7, 2008    (JP) .................................. 2008-203892

(51) Int. Cl.
*C08F 2/46*    (2006.01)

(52) U.S. Cl. ........ 427/492; 427/511; 427/164; 427/168; 427/372.2; 430/7; 349/106; 347/106; 347/107

(58) Field of Classification Search .................. 427/492, 427/511, 164, 168, 372.2; 430/7; 349/106; 347/106, 107
See application file for complete search history.

(56) References Cited

U.S. PATENT DOCUMENTS

| 6,500,485 | B1 | 12/2002 | Yamaguchi et al. |
| 2006/0084206 | A1* | 4/2006 | Moriya et al. ................ 438/149 |
| 2006/0244808 | A1* | 11/2006 | Miura ........................... 347/135 |

FOREIGN PATENT DOCUMENTS

JP    09-281324 A    10/1997

* cited by examiner

*Primary Examiner* — Michael Cleveland
*Assistant Examiner* — Xiao Zhao
(74) *Attorney, Agent, or Firm* — Global IP Counselors, LLP

(57) ABSTRACT

A method is provided for manufacturing a film formation member having a dividing wall provided on a substrate to form a plurality of partitioned sections with a film being formed within each of the partitioned sections by discharging a predetermined amount of liquid within each of the partitioned sections. The method includes identifying a position of at least one of the partitioned section as a partitioned section with nonuniform liquid affinity among the partitioned sections, and discharging the liquid over a wider discharge range inside the partitioned section with nonuniform liquid affinity than a discharge range inside a partitioned section other than the partitioned section with nonuniform liquid affinity.

10 Claims, 13 Drawing Sheets

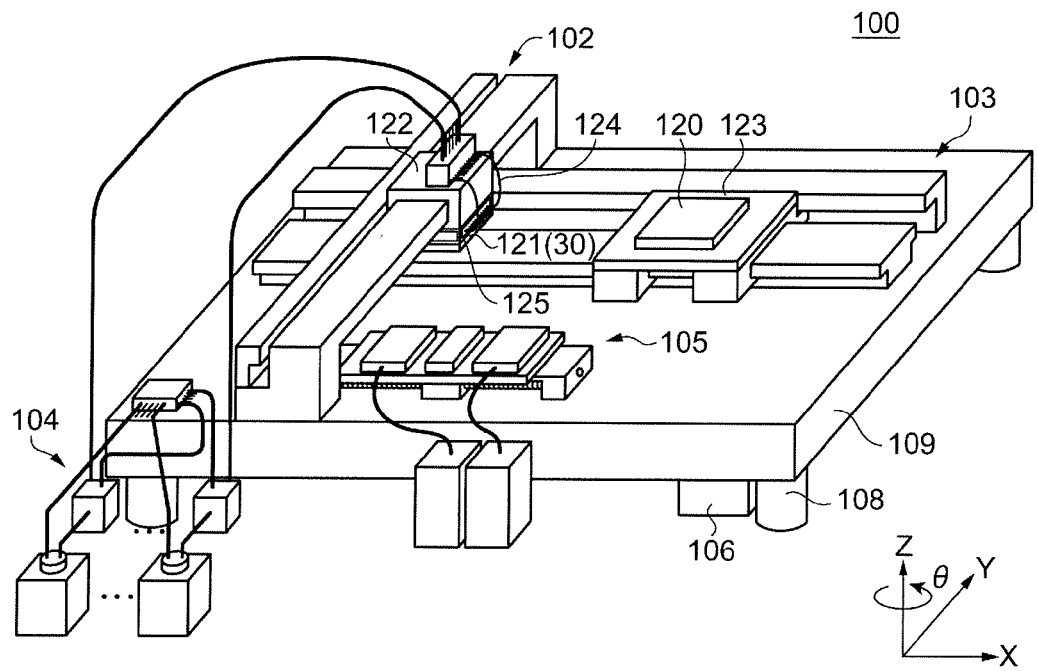
F I G. 2
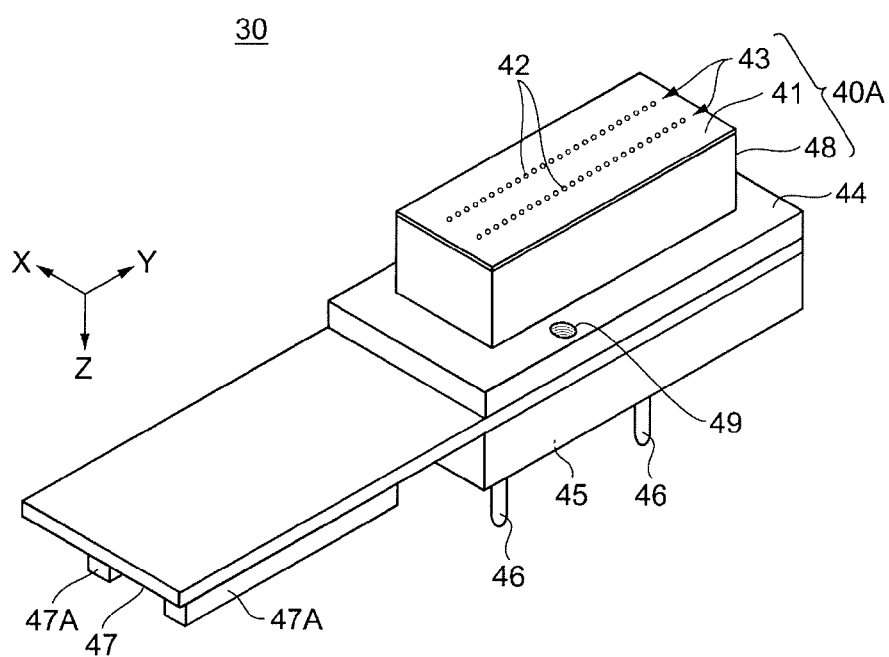
F I G. 3

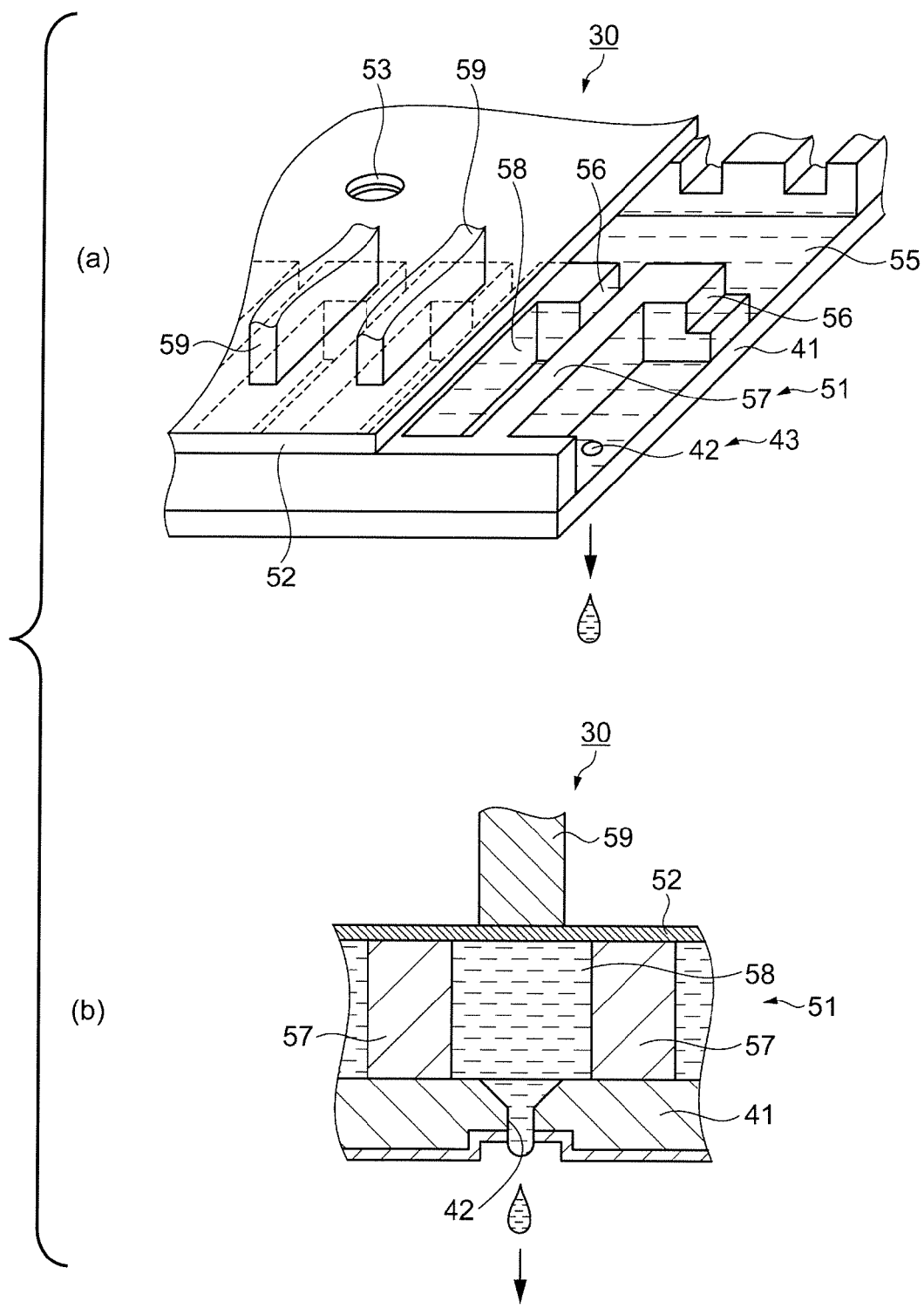
F I G. 4

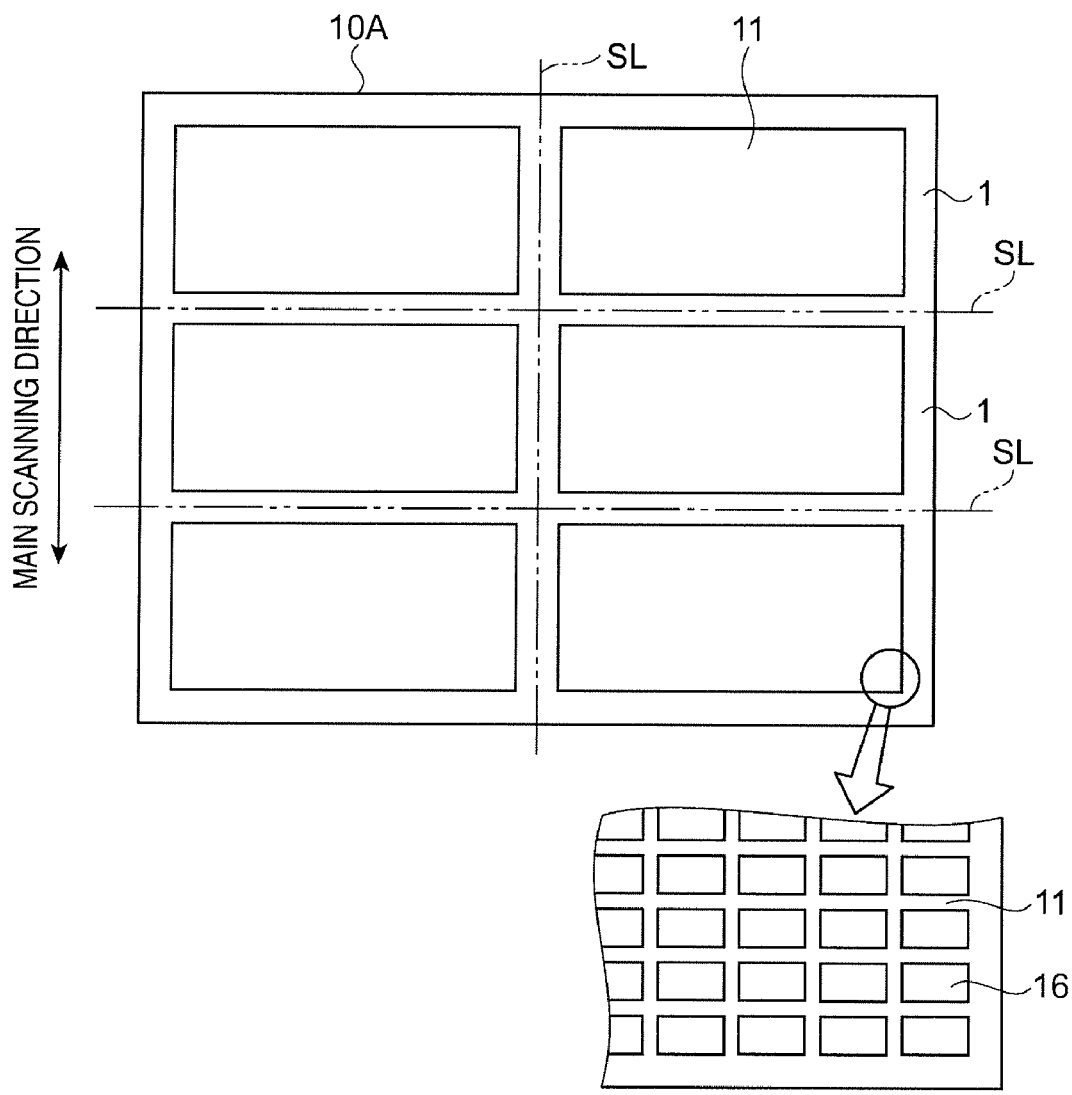
F I G. 7

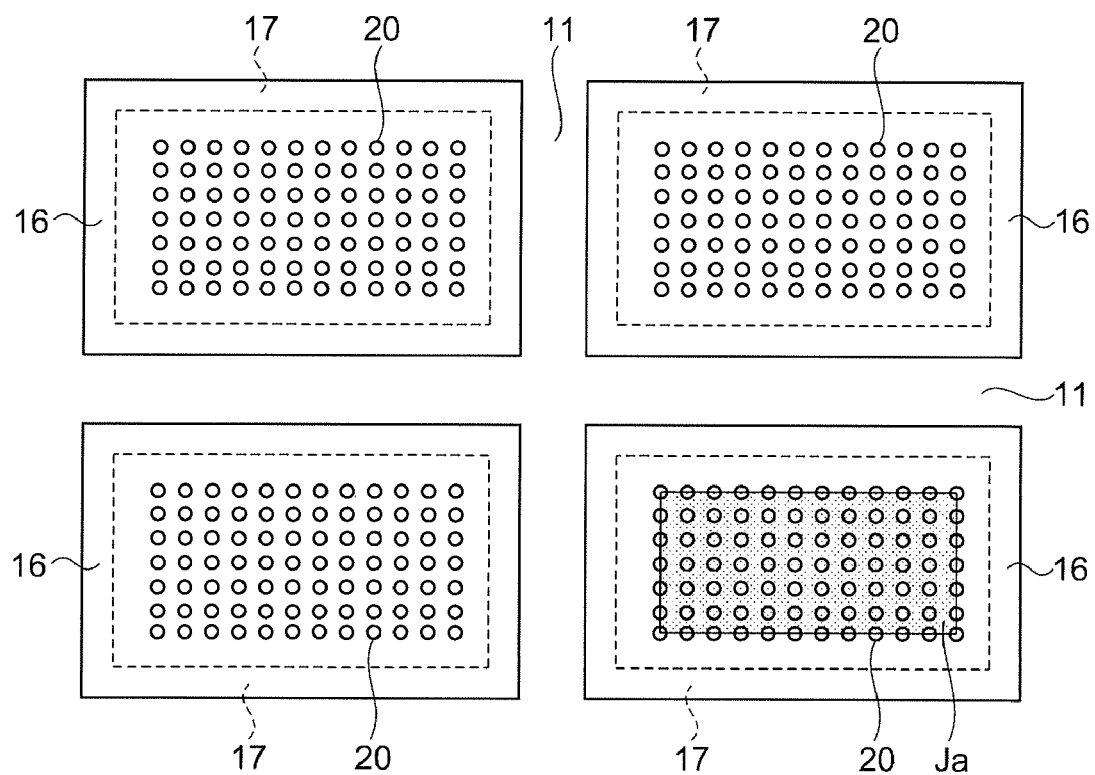
F I G. 10

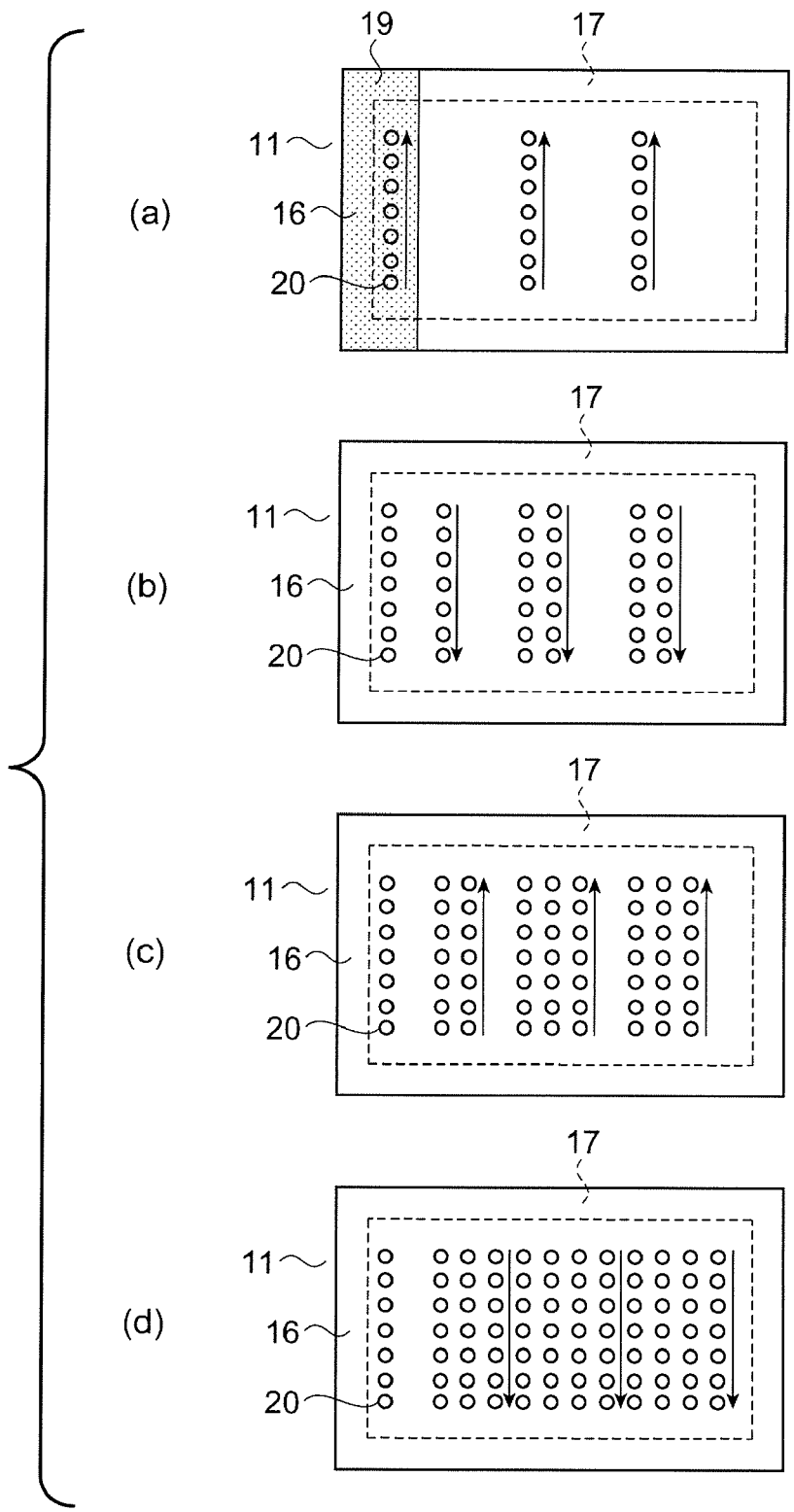
F I G. 15

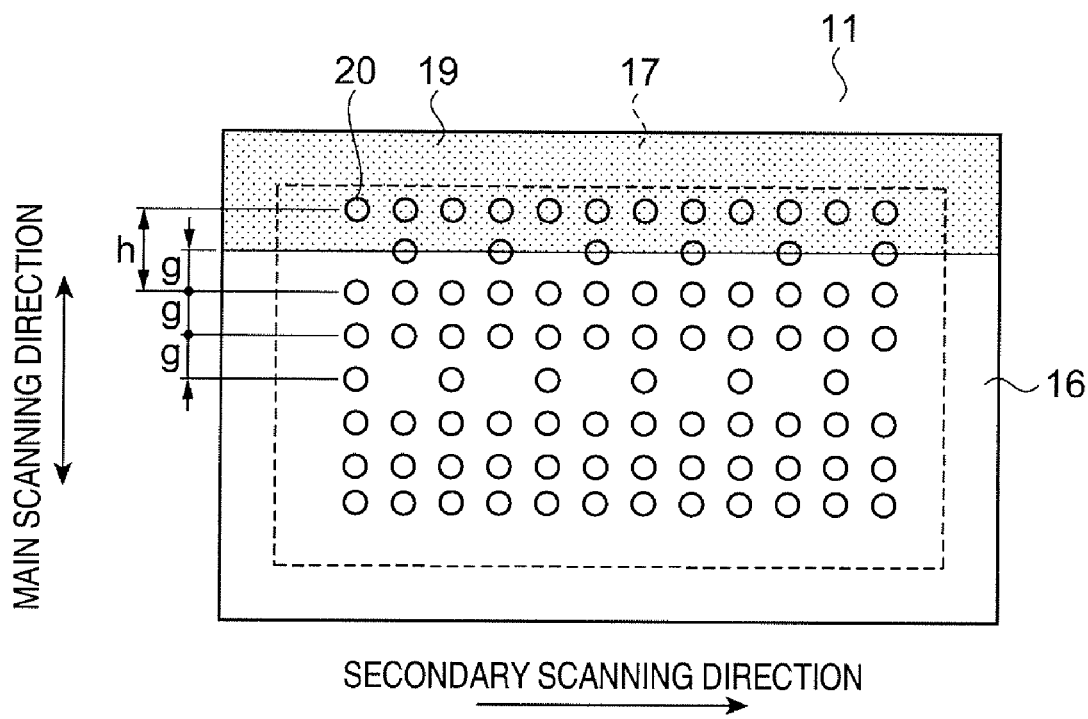
F I G. 16

METHOD FOR MANUFACTURING FILM FORMATION MEMBER

CROSS-REFERENCE TO RELATED APPLICATIONS

This application claims priority to Japanese Patent Application No. 2008-203892 filed on Aug. 7, 2008. The entire disclosure of Japanese Patent Application No. 2008-203892 is hereby incorporated herein by reference.

BACKGROUND

1. Technical Field

The present invention relates to a method for manufacturing a film formation member having a color filter or another patterned film.

2. Related Art

A droplet discharge method is known to be used as a method for manufacturing a film formation member for forming a film in a partitioned area on a substrate such as color filter or the like.

An example of a method for manufacturing a color filter using the droplet discharge method is a method in which a fluid acting as coloring matter film material is discharged as droplets toward partitioned coloring matter film formation areas on a glass substrate using a droplet discharge head, and thereafter drying the droplets to form a coloring matter film (see Japanese Laid-Open Patent Application No. 9-281324 A).

SUMMARY

With such a method for manufacturing a color filter, a treatment for liquid affinity is performed on the surface of a glass substrate so that the landed droplets wetten and spread out.

However, variability occurs in the treatment for liquid affinity due to larger glass substrates that are to undergo the treatment for liquid affinity, as well as due to other factors. In such a case, there is a problem in that portions with weak liquid affinity form in the glass substrate, the wetting and spreading of the droplets is insufficient in the coloring matter film formation areas of the weak portions and incomplete coverage by coloring matter film occurs.

The present invention was contrived in order to solve at least a part of the problem described above and can be implemented in the following modes and applications examples.

A method according to a first aspect of the present invention is a method for manufacturing a film formation member having a dividing wall provided on a substrate to form a plurality of partitioned sections with a film being formed within each of the partitioned sections by discharging a predetermined amount of liquid within each of the partitioned sections. The method includes identifying a position of at least one of the partitioned section as a partitioned section with nonuniform liquid affinity among the partitioned sections, and discharging the liquid over a wider discharge range inside the partitioned section with nonuniform liquid affinity than a discharge range inside a partitioned section other than the partitioned section with nonuniform liquid affinity.

In accordance with this manufacturing method, the discharge range is increased and the liquid is discharged in partitioned sections that are weaker liquid affinity than partitioned sections that are strong liquid affinity. In this manner, the liquid can wetten and spread on the entire surface inside the partitioned section even in portions in which the liquid affinity of the partitioned section is weak and droplet wetting and spreading is poor. An excellent film with complete coverage can be formed by solidifying the liquid. In this manner, a method for manufacturing a film formation member with complete film coverage can be provided.

The method for manufacturing a film formation member according to a second aspect is preferably one in which the discharging of the liquid inside the partitioned section with nonuniform liquid affinity includes discharging the liquid at a position having a shorter distance to the dividing wall in at least one side of the partitioned section with nonuniform liquid affinity than a distance between a discharge position and the dividing wall in the partitioned sections other than the partitioned section with nonuniform liquid affinity, with each of the partitioned sections having a quadrangular shape.

In accordance with this manufacturing method, the liquid is discharged in the outermost periphery in a position near the dividing wall on at least one side of the quadrangular partitioned section. In this manner, the liquid discharged from the droplet discharge head is readily deposited and formed when the liquid is discharged over a wide discharge range. The liquid readily wets and spreads inside the partitioned section when the outermost peripheral droplets are deposited in a position near the dividing wall in response to portions with weak liquid affinity.

The method for manufacturing a film formation member according to a third aspect is preferably one in which the discharging of the liquid inside the partitioned section with nonuniform liquid affinity includes discharging the liquid from portions with strong liquid affinity toward portions with weak liquid affinity within the partitioned section with nonuniform liquid affinity, and discharging the liquid in a position near the dividing wall for a longer interval than other section in the partitioned section with nonuniform liquid affinity.

In accordance with this manufacturing method, the liquid is discharged in a position near the dividing walls for a longer interval than elsewhere when the liquid is discharged from portions with strong liquid affinity toward portions with weak liquid affinity in the partitioned section.

The liquid discharged in the partitioned sections having portions with strong liquid affinity sequentially wets, spreads, and joins with previously discharged liquid. The portions with weak liquid affinity prevent further wetting and spreading when the liquid lands and then weakly spreads or is attracted and joined to previously discharged liquid.

Therefore, when the liquid is discharged in a position near the dividing walls for a longer interval than elsewhere, the liquid is prevented from being attracted to and joining with previously discharged liquid, and liquid can be deposited without the occurrence of incomplete coverage within the partitioned sections.

The method for manufacturing a film formation member according to a fourth aspect is preferably one in which the discharging of the liquid inside the partitioned section with nonuniform liquid affinity includes discharging the liquid from portions with strong liquid affinity toward portions with weak liquid affinity within the partitioned section with nonuniform liquid affinity with the liquid being discharged in the portions with weak liquid affinity in equal intervals.

In accordance with this manufacturing method, the liquid is discharged in equal intervals in the portions with weak liquid affinity when the liquid is discharged beginning from the portions with weak liquid affinity toward portions with strong liquid affinity. Since spreading is poor after the liquid has landed in a portion with weak liquid affinity, the liquid thus landed joins together when deposited at equal intervals and the liquid can be deposited with complete coverage within the partitioned section.

The method for manufacturing a film formation member according to a fifth aspect is preferably one in which the discharging of the liquid inside the partitioned section with nonuniform liquid affinity includes discharging the liquid from a portion that is weak liquid affinity and that is near the dividing wall.

In accordance with this manufacturing method, the liquid is first discharged beginning from the portion near the dividing wall where liquid affinity is weak. Therefore, droplets can be deposited without the occurrence of incomplete coverage inside the partitioned section and without interfering with the spread of the first droplet, even when a droplet is subsequently discharged in an adjacent row and the liquid joins together.

The method for manufacturing a film formation member according to a sixth aspect is preferably one in which the identifying of the position of at least one of the partitioned section as the partitioned section with nonuniform liquid affinity includes identifying a portion in which a thickness of the liquid after discharge or a thickness of the film formed is less than a prescribed value as a portion with weak liquid affinity.

In accordance with this manufacturing method, the portions with weak liquid affinity can be readily specified by confirming the thickness of the liquid after droplet discharge or the thickness of the film. In other words, the partitioned section or the portion of the partitioned section in which the thickness is less than an optimum value is a portion in which the liquid has not wet and spread can be specified as a location with weak liquid affinity.

The method for manufacturing a film formation member is particularly effective in that portions with weak liquid affinity can be readily specified on a substrate having nonuniformity of liquid affinity.

BRIEF DESCRIPTION OF THE DRAWINGS

Referring now to the attached drawings which form a part of this original disclosure:

FIG. 1 shows the configuration of a color filter, wherein FIG. 1(a) is a schematic plan view, and FIG. 1(b) is a schematic cross-sectional view along the sectional line M-M of FIG. 1(a);

FIG. 2 is a perspective view of the external appearance showing the general configuration of the droplet discharge device;

FIG. 3 is a perspective view of the external appearance of the droplet discharge head as viewed from the nozzle plate side;

FIG. 4 shows the structure of the droplet discharge head, wherein FIG. 4(a) is a perspective cross-sectional view showing the structure around the pressure chamber of the droplet discharge head, and FIG. 4(b) is a cross-sectional view showing the structure of the discharge nozzle section of the droplet discharge head;

FIG. 7 is a schematic plan view showing the configuration of a mother substrate provided with partitioned sections for manufacturing numerous color filters;

FIG. 10 is a schematic diagram showing the arrangement of the droplets deposited in the partitioned sections of the areas J;

FIG. 15 is a schematic diagram showing the discharge procedure of the droplets of the areas B;

FIG. 16 is a schematic diagram showing another arrangement of the droplets deposited in the partitioned sections of the areas G.

DETAILED DESCRIPTION OF EXEMPLARY EMBODIMENTS

Figure 1:
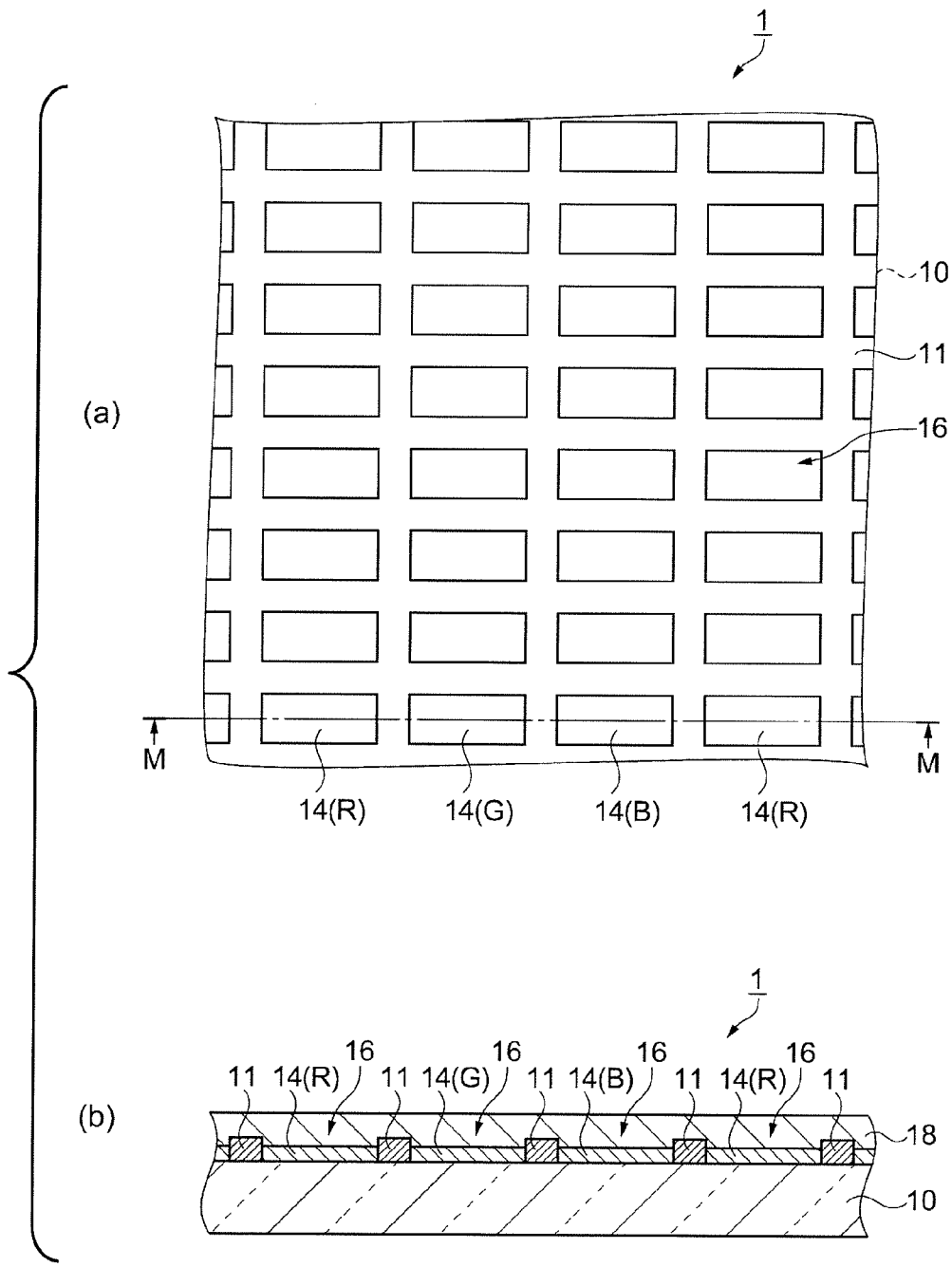

Specific embodiments of the present invention will be described below with reference to the accompanying drawings. In the drawings used in following description, the dimensional ratio of each member is suitably modified in order to obtain a size that allows each member to be recognized.

EMBODIMENTS

Film Formation Member

A color filter is described as an example of a film formation member in the present embodiment.

FIG. 1 shows the configuration of a color filter, wherein FIG. 1(a) is a schematic plan view and FIG. 1(b) is a schematic cross-sectional view along the cross-sectional line M-M of FIG. 1(a).

The color filter 1 is composed of a substrate 10, dividing walls 11 formed on the substrate 10, a partitioned section 16 partitioned by the dividing walls 11, a coloring matter film 14 formed inside the partitioned section 16, a protective film 18 formed on the dividing walls 11 and the coloring matter film 14, and other components.

The substrate 10 is transparent and glass, quartz, plastic, or other plate material is generally used.

The dividing walls 11 are formed in the shape of a grid that protrudes in the thickness direction of the substrate 10, and a plurality of quadrangular partitioned sections 16 are partitioned by the dividing walls 11 on the surface of the substrate 10. The dividing walls 11 are formed using a photosensitive resin with the aid of lithographic techniques, and have light-blocking properties. The dividing walls 11 are not required to have light-blocking properties and may be formed using a separate light-blocking layer using a metal or the light.

The coloring matter films 14(R), 14(G), 14(B) of R (red), (G) green, and (B) blue are formed as filter elements in the partitioned sections 16 partitioned by the dividing walls 11. The coloring matter films 14 are formed by solidifying a fluid composed of a mixture of a colorant (pigment, dye, or the like) and a solvent in acrylic resin or another resin.

A transparent protective film 18 is formed on the dividing walls 11 and the coloring matter films 14 to protect the filter elements.

Configuration of Droplet Discharge Device

The present embodiment uses a droplet discharge method as a method for coating a fluid acting as the material of the coloring matter films 14 in the partitioned sections 16 of the coloring matter films 14. The configuration of the droplet discharge device used for manufacturing the color filter 1 will now be described.

FIG. 2 is a perspective view of the external appearance showing the general configuration of the droplet discharge device.

The droplet discharge device 100 is provided with a plurality of support legs 108 disposed on floor, and a surface plate 109 disposed on the upper side of the support legs 108. A workpiece mechanism section 103 is disposed on the upper side (Z-axis direction) of the surface plate 109 so as to extend in the lengthwise direction (X-axis direction) of the surface plate 109. A head mechanism section 102 supported by two support columns fixed to the surface plate 109 is disposed above the workpiece mechanism section 103 so as to extend in the direction orthogonal to the workpiece mechanism section 103 (Y-axis direction). A fluid feed section 104 is provided by the side of the surface plate 109, and also disposed is a fluid tank or the like having a feed tube that is in communication with a droplet discharge head 30 of the head mechanism section 102. A maintenance device section 105 is disposed in the vicinity of one of the support columns of the head mechanism section 102 in the X-axis direction parallel to the workpiece mechanism section 103. A discharge device control section 106 is furthermore accommodated on the lower side of the surface plate 109.

The head mechanism section 102 is provided with a head unit 121 having a droplet discharge head 30 for discharging a fluid as droplets, and a head carriage 125 for supporting the head unit 121. Also provided is a movement frame (Y-axis direction) 122 from which the head carriage 125 is suspended. The droplet discharge head 30 is moved freely moved in the Y-axis direction and held in the moved position by moving the movement frame 122 in the Y-axis direction.

The workpiece mechanism section 103 has a workpiece stage (X-axis table) 123 on which a workpiece 120 is placed as the discharge target of the droplets discharged from the droplet discharge head 30. The workpiece mechanism section 103 moves the workpiece stage 123 in the X-axis direction, whereby the workpiece 120 placed on the workpiece stage 123 is moved in the X-axis direction and held in the moved position.

The fluid feed section 104 has a fluid feed tube 124, and the fluid feed tube 124 is connected to the droplet discharge head 30. The fluid is fed to the droplet discharge head 30 via the fluid feed tube 124.

The maintenance device section 105 is provided with a device for inspecting and maintaining the droplet discharge head 30.

The droplet discharge device 100 is provided with the discharge device control section 106 for comprehensively controlling the mechanisms or the like.

In this manner, the droplet discharge head 30 moves to the discharge position in the Y-axis direction and stops, and the fluid is discharged as droplets in synchronization with the movement of the workpiece 120 below in the X-axis direction. Droplets can be made to land in any position on the workpiece 120 by controlling the relative movement of the workpiece 120 that moves in the X-axis direction and the droplet discharge head 30 that moves in the Y-axis direction, whereby desired drawing can be carried out.

The droplet discharge device 100 of the present embodiment is designed so that the workpiece stage 123 reciprocates in the X-axis direction (main scanning direction) of the drawings and droplets of the fluid are discharged onto the workpiece 120. When fluid has been discharged in a single scan, the movement frame 122 from which the head carriage 125 is suspended is moved in the Y-axis direction (secondary scanning direction), and droplets of the fluid are discharged in the next area of the workpiece 120. This operation is repeated and droplets can be coated in the areas to which droplets are to be discharged.

Droplet Discharge Head

Next, the droplet discharge head 30 will be described with reference to FIGS. 3 and 4. FIG. 3 is a perspective view of the external appearance of the droplet discharge head as viewed from the nozzle plate side. FIG. 4 is a perspective cross-sectional view showing the structure of droplet discharge head. FIG. 4(*a*) is a perspective cross-sectional view showing the structure around the pressure chamber of the droplet discharge head, and FIG. 4(*b*) is a cross-sectional view showing the structure of the discharge nozzle section of the droplet discharge head.

The droplet discharge head 30 is a so-called two-row head, and is provided with a fluid introduction section 45 having two connection needles 46, as well as a laterally extended head substrate 47, a case head 48, and a nozzle plate 41, as shown in FIG. 3. The fluid feed tube is connected to the connection needles 46 through which the fluid is fed to the fluid introduction section 45. A pair of head connectors 47A is mounted on the head substrate 47, and a flexible cable is connected to the head substrate 47. A quadrangular head main body 40A is composed of the case head 48 and the nozzle plate 41.

The base section side of the head main body 40A has a flange section 44 formed in the shape of a quadrangular flange for seating the fluid introduction section 45 and the head substrate 47. A pair of female screws 49 for securing the droplet discharge head 30 is formed in the flange section 44.

A plurality of nozzles 42 for discharging droplets is rectilinearly aligned and a nozzle row 43 is formed on the nozzle plate 41. Two nozzle rows 43 are aligned substantially parallel to each to other.

In a state in which the droplet discharge head 30 is mounted on the droplet discharge device 100, the nozzle rows 43 extend in the Y-axis direction. The nozzles rows are not limited to two rows, and three or more rows may be provided. The orientation of the array is oriented or otherwise arranged in the Y-axis direction, but the orientation is not required to match the Y-axis direction. A plurality of droplet discharge heads 30 such as that described above may be arrayed and provided to the droplet discharge device 100.

The droplet discharge head 30 has a pressure chamber plate 51 constituting the case head 48 that is layered on the nozzle plate 41 and a vibration plate 52 is layered on the pressure chamber plate 51, as shown in FIGS. 4(*a*) and 4(*b*).

A fluid reservoir 55 filled with fluid fed from the fluid introduction section 45 via a fluid feed hole 53 of the vibration plate 52 is formed in the pressure chamber plate 51. The fluid reservoir 55 is a space enclosed by the vibration plate 52, the nozzle plate 41, and the walls of the pressure chamber plate 51. A pressure chamber 58 partitioned by a plurality of head partition walls 57 is formed in the pressure chamber plate 51. The space enclosed by the vibration plate 52, the nozzle plate 41, and two head partition walls 57 is the pressure chamber 58.

The pressure chamber 58 is provided in correspondence with each of the nozzles. Fluid from the fluid reservoir 55 is fed to the pressure chamber 58 via a feed port 56 positioned between the two head partition walls 57. The assemblies of the head partition walls 57, the pressure chamber 58, the nozzles 42, and the feed port 56 are aligned in a single row along the fluid reservoir 55, and the nozzles 42 aligned in a single row form a nozzle row 43.

One end of piezoelectric elements 59 is secured to each of the portions constituting the pressure chamber 58 of the vibration plate 52.

The piezoelectric elements 59 have electrostrictive sections obtained by layering an electrode layer and a piezoelectric material, and the electrostrictive sections contractably or expandably deform in the lengthwise direction when a predetermined voltage waveform is applied to the electrode layer, whereby the vibration plate 52 is made to bend and pressure is applied to the fluid present in the pressure chamber 58. As a result, the pressurized fluid is discharged as a droplet from the nozzles 42 of the droplet discharge head 30.

Electrical Configuration of Droplet Discharge Device

Figure 5:
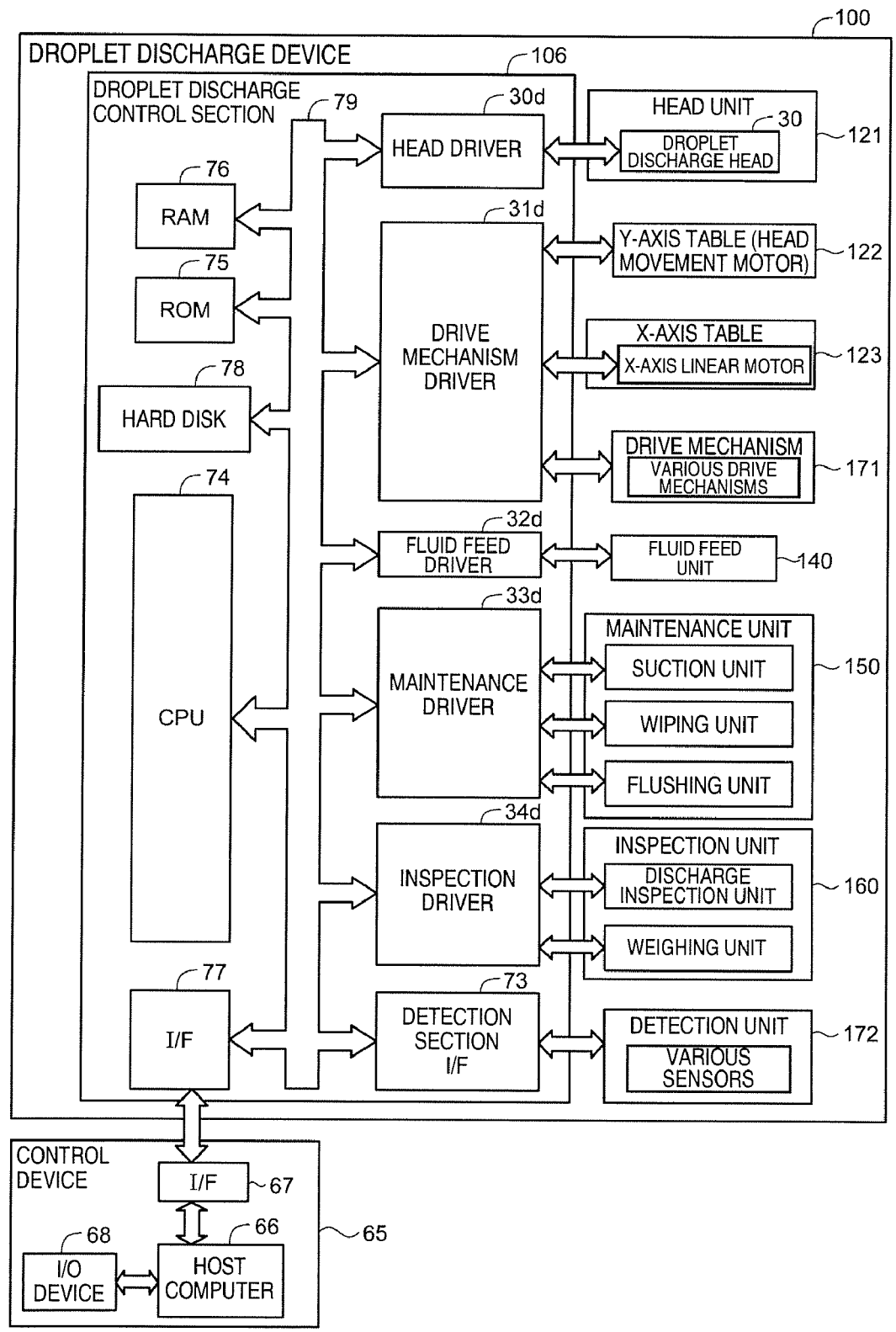
FIG. 5 is an electrical configuration block diagram showing the electrical configuration of the droplet discharge device.

Next, the electrical configuration for driving a droplet discharge device 100 having configuration such as that described above will be described with reference to FIG. 5. FIG. 5 is an electrical configuration block diagram showing the electrical configuration of the droplet discharge device.

The droplet discharge device 100 is controlled by inputting data, as well as operation start, stop, and other command instructions via the a control device 65. The control device 65 has a host computer 66 for performing computational processes, and an I/O device 68 for inputting and outputting information to the droplet discharge device 100, and is connected to the discharge device control section 106 via an interface (I/F) 67. The I/O device 68 is a keyboard that can input information, an external I/O device for inputting and outputting information via a recording medium, a recording section for saving information inputted via the external I/O device, a monitor device, or the like.

The discharge device control section 106 of the substrate 100 has an interface (I/F) 77, a CPU (central processing unit) 74, a ROM (read only memory) 75, a RAM (random access memory) 76, and a hard disk drive 78. Also provided are a head driver 30d, a drive mechanism driver 31d, a fluid feed driver 32d, a maintenance driver 33d, an inspection driver 34d, and a detection section interface (I/F) 73. These components are electrically connected to each other via a data bus 79.

The interface 77 performs data transfers with the control device 65. The CPU 74 performs various computational processes on the basis of commands from the control device 65 and outputs control signals for controlling the operation of each section of the droplet discharge device 100. The RAM 76 temporarily stores print data and control commands received from the control device 65 in accordance with commands from the CPU 74. The ROM 75 stores routines or the like that are used by the CPU 74 to perform various computational processes. The hard disk drive 78 stores print data and control commands received from the control device 65, and stores routines or the like that are used by the CPU 74 to perform various computational processes.

A droplet discharge head 30 constituting the head unit 121 is connected to the head driver 30d. The head driver 30d drives the droplet discharge head 30 and causes droplets of the fluid to be discharged in accordance with control signals from the CPU 74.

Connected to the drive mechanism driver 31d are: a head movement motor of a Y-axis table 122 constituting the head mechanism section 102, an X-axis linear motor of the X-axis table 123 constituting the workpiece mechanism section 103, and a drive mechanism 171 that includes various drive mechanisms having various drive sources. The various drive mechanisms include a camera movement motor for moving the alignment camera, a drive motor of a θ-rotation mechanism constituting the head mechanism section 102, and a drive motor of a θ-rotation mechanism constituting the workpiece mechanism section 103. The drive mechanism driver 31d drives the above-described motors or the like in accordance with control signals from the CPU 74, causes the droplet discharge head 30 and the workpiece 120 to move in a relative fashion, causes the droplet discharge head 30 to face an arbitrary position of the workpiece 120, and causes a droplet of the fluid to land in an arbitrary position on the workpiece 120 so as to deposit a droplet in a predetermined position.

A fluid feed unit 140 constituting the fluid supply section 104 is connected to the fluid feed driver 32d. The fluid feed driver 32d drives the fluid feed unit 140 and feeds fluid to the droplet discharge head 30 in accordance with control signals from the CPU 74.

Connected to the maintenance driver 33d are a suction unit of a maintenance unit 150 that is included in the maintenance device section 105, a wiping unit, and a flushing unit. The maintenance driver 33d drives the suction unit, the wiping unit, or the flushing unit in accordance with control signals from the CPU 74, and carries out maintenance operations for the droplet discharge head 30.

Connected to the inspection driver 34d are a weighing unit, and a discharge inspection unit of an inspection unit 160 that is included in the maintenance device section 105. The inspection driver 34d drives the discharge inspection unit or the weighing unit in accordance with control signals from the CPU 74, and inspects the discharge weight, whether or not discharging can be performed, landing position accuracy, or other discharge states of the droplet discharge head 30.

An inspection section 172 that includes various sensors is connected to the detection section interface 73. The detection information detected by the sensors of the detection section 172 is transmitted to the CPU 74 via the detection section interface 73.

Method for Manufacturing Film Formation Member

The method for manufacturing a film formation member will be described next.

Figure 8:
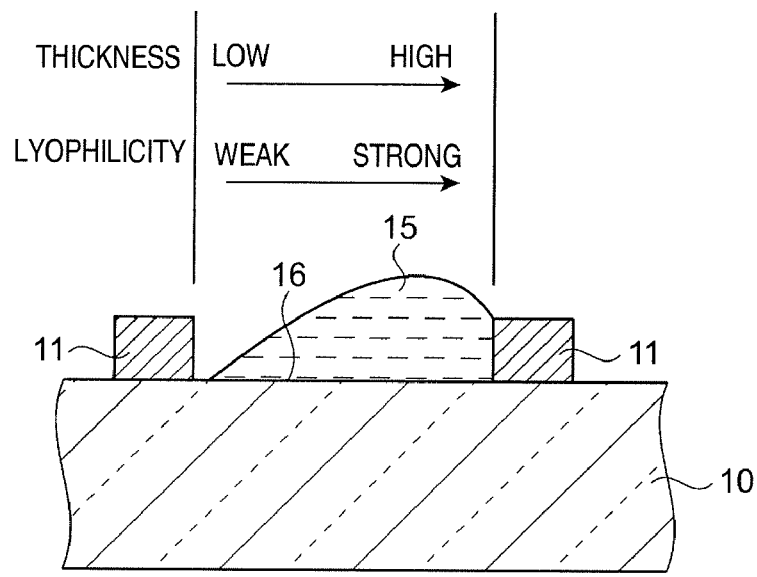
FIG. 8 is a schematic cross-sectional view describing the relationship between the liquid affinity and the thickness of the fluid formed in the partitioned section.
Figure 9:
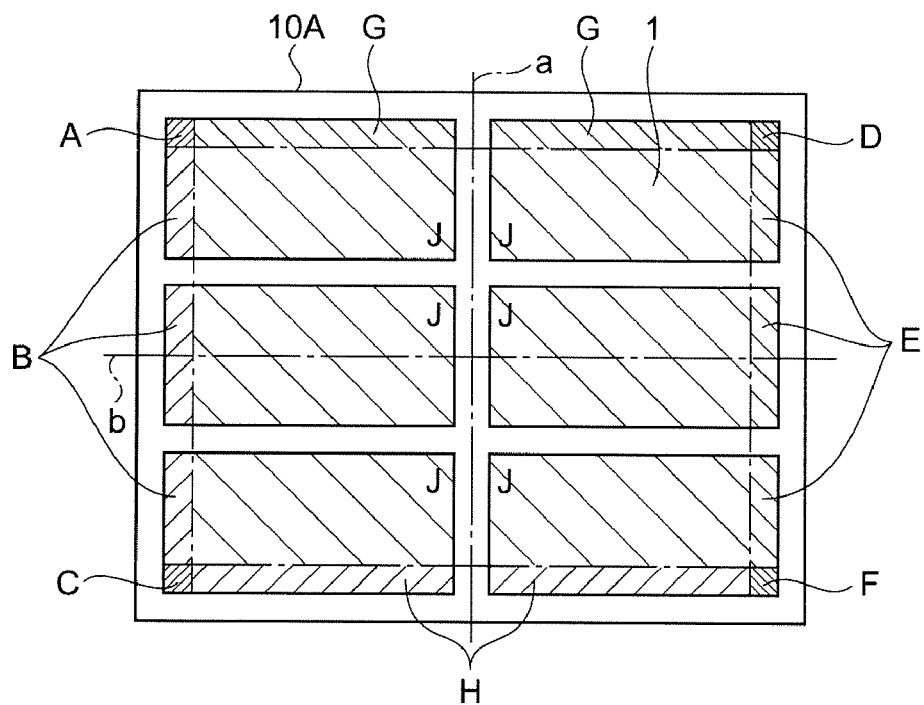
FIG. 9 is a descriptive view showing the areas in which the droplets are deposited in different patterns in the partitioned sections.

FIG. 6 is a flowchart for describing the steps for manufacturing a color filter. FIG. 7 is a plan view showing the configuration of a mother substrate provided with partitioned sections for manufacturing numerous color filters. FIG. 8 is a schematic cross-sectional view describing the relationship between the liquid affinity and the thickness of the fluid formed in the partitioned section. FIG. 9 is a descriptive view showing the areas in which the droplets are deposited in different patterns in the partitioned sections. FIGS. 10 through 14 are schematic diagrams showing the arrangement of the droplets deposited in the partitioned sections of each area.

The manufacturing steps of the color filter are described below with reference to the flowchart in FIG. 6.

Figure 6A:
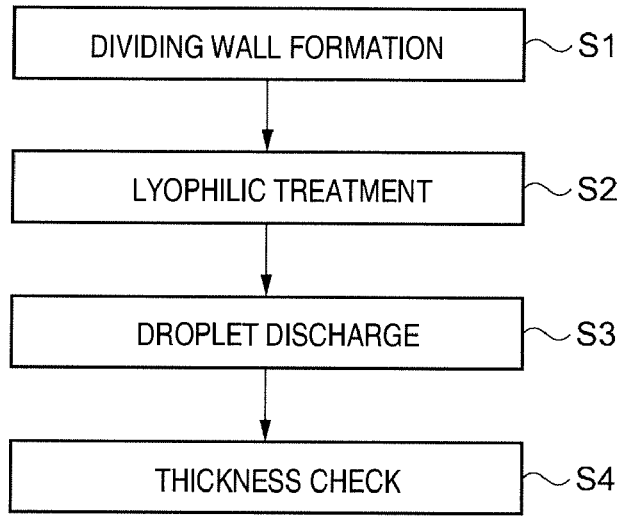
FIG. 6A is a flowchart for describing the steps for identifying the partitioned sections with nonuniform liquid affinity.

A partitioned section identification step for checking the liquid affinity in each partitioned section and identifying partitioned sections with nonuniform liquid affinity is initially carried out in the manufacture of a color filter (see FIG. 6A).

A large transparent mother substrate 10A is prepared, as shown in FIG. 7. Areas for forming numerous color filters are established on a single substrate on the large mother substrate 10A.

The mother substrate 10A has a rectangular shape and is set so that the crosswise direction is the main scanning direction of the droplet discharge device. Coloring matter films are formed in the partitioned sections 16, a protective film or the like is formed thereon, and the mother substrate 10A is sectioned along the sectioning lines SL, whereby individual color filters 1 are separated from the mother substrate 10A.

First, dividing walls 11 are formed in areas for forming the color filters of the mother substrate 10A (step S1). The numerous partitioned sections 16 partitioned by the dividing walls 11 are rectangularly formed, and the areas of the partitioned sections 16 are areas in which the coloring matter films are to be deposited. The crosswise direction of the partitioned sections 16 is set to be the main scanning direction of the droplet discharge device. The dividing walls 11 can be formed from a photosensitive resin film using photolithographic techniques.

Next, the mother substrate 10A is subjected to treatment for liquid affinity so as to impart liquid affinity to the partitioned sections 16 (step S2). The treatment for liquid affinity step may be a UV ray treatment for irradiating UV rays, an oxygen plasma treatment in which oxygen is used as a treatment gas in an atmospheric environment, or another treatment. The treatment for liquid affinity may be carried out in only the partitioned sections 16.

Next, fluid is discharged as droplets from the droplet discharge head into the partitioned sections 16 using the droplet discharge device described above (step S3).

FIG. 10 is a schematic diagram showing the arrangement of the droplets deposited in the partitioned sections. The circle marks in the drawing indicates the droplet center.

A draw-prohibited area 17 is established in the partitioned sections 16 along the dividing walls 11 enclosing the partitioned sections 16. The draw-prohibited area 17 is established in all partitioned sections 16 so that droplets are not deposited in the area in order to prevent droplets from landing outside the partitioned sections 16 due to deflections in the flight of the droplets when the fluid is discharged as droplets from the droplet discharge head.

Droplets are discharged and the fluid is coated in the partitioned sections 16 so that the droplet center 20 of the outermost periphery is disposed at substantially the same distance from the dividing walls 11 enclosing the four sides of the partitioned sections 16.

Next, the thickness of the fluid in the partitioned sections 16 is checked and portions with weak liquid affinity are specified (step S4). The manner in which thickness of the fluid is checked will be described with reference to FIG. 8.

As shown in FIG. 8, the dividing walls 11 are formed on the substrate 10, and the partitioned sections 16 are partitioned. The fluid 15 is coated in the partitioned sections 16. The fluid 15 is thick in relation to a predetermined thickness on one side near the dividing wall 11 and is thin in relation to a predetermined thickness on the other side near the dividing wall 11. The fluid does not sufficiently wetten and spread in portions with weak liquid affinity and the thickness of such portions tends to be low. In this case, the thick portions of the fluid 15 are specified as "strong" liquid affinity, and the thin portions of the fluid 15 (including portions where the fluid 15 is not present) are specified as "weak" liquid affinity.

The thickness is checked by confirmation using an image-processing device, by visual confirmation using a microscope, or by another method. The number of substrates to be checked is suitably determined in accordance with variability conditions of the liquid affinity.

The detection of the liquid affinity may also be carried out by checking the thickness of the coloring matter films resulting form solidification of the fluid 15, and it is also possible to specify liquid affinity by thickness.

In a liquid affinity confirmation step such as that described above, the mother substrate treated with liquid affinity 10A is confirmed to have a tendency to be weaker liquid affinity in the external peripheral edge portion than in other portions.

In the partitioned sections 16 that are the weaker liquid affinity areas, the portion near the dividing walls of the partitioned sections on the side near the external peripheral of the mother substrate 10A is confirmed to have a tendency to be even more weak liquid affinity. However, the position of the partitioned sections having nonuniformity of liquid affinity is thought to vary depending on the size of the mother substrate 10A, the treatment for liquid affinity method, and the like.

Figure 6B:
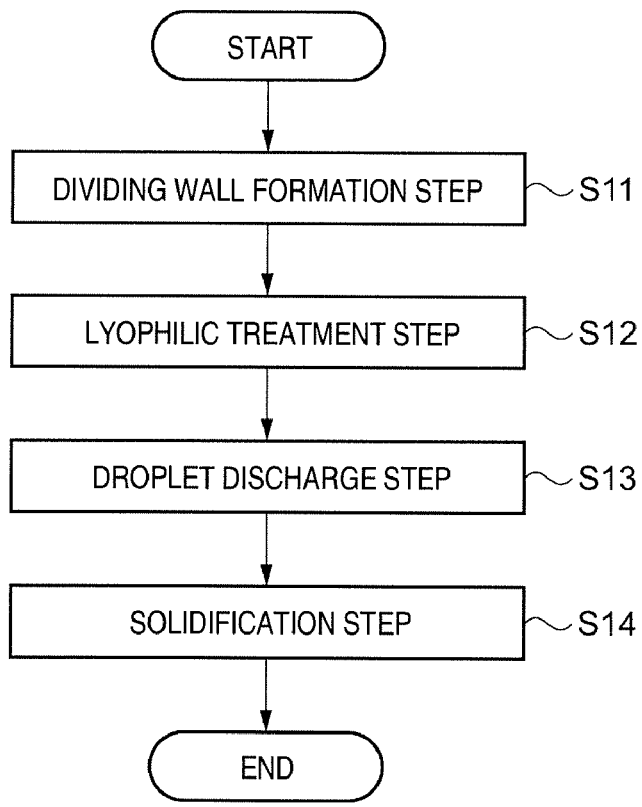
FIG. 6B is a flowchart for describing the steps for manufacturing a color filter.

The steps for manufacturing a color filter will be described next (see FIG. 6B).

First, dividing walls 11 are formed in areas of the mother substrate 10A in which the color filters are to be formed (step S11).

Next, the mother substrate 10A is subjected to a treatment for liquid affinity so as to impart liquid affinity to the partitioned sections 16 (step S12).

These two steps are carried out in the same manner as step S1 and step S2 described in the liquid affinity confirmation step.

Next, fluid is discharged as droplets from the droplet discharge head into the partitioned sections 16 using the droplet discharge device described above (step S13).

The partitioned sections located in the external peripheral edge portions with weak liquid affinity of the mother substrate 10A are classified into areas A through H (portions with weak liquid affinity) on the basis of the results of the liquid affinity confirmation step, as shown in FIG. 9. Other areas are classified as areas J (portions with strong liquid affinity), and the droplet arrangement used in the partitioned sections located in each of the areas is modified. A number of rows (three or four rows) of partitioned sections are included in the areas A through H.

In this manner, the droplet arrangement using in each partitioned section is different for each color filter in the plurality of color filters disposed on a single mother substrate 10A. The droplet arrangement used in the partitioned sections is different depending on the location within a single color filter as well.

The arranged rows of droplets in each area will be described with reference to FIGS. 10 through 14. Four partitioned sections are shown in these drawings, and the droplet positions are shown assuming that the discharged droplets have landed without deflection. Also, the circle marks in the drawings indicate the droplet center.

FIG. 10 is a schematic diagram showing the droplets deposited in the partitioned sections of the areas J. The arrangement of the droplets is the same arrangement as the droplet arrangement used in the partitioned sections in the liquid affinity confirmation step. The areas J are areas having the partitioned sections 16 positioned in portions that do not include the external peripheral edge portion of the mother substrate 10A.

In the partitioned sections 16 of the areas J, droplets are discharged and the fluid is coated so that the droplet centers 20 at the outermost periphery are disposed at the same distance from the dividing walls 11. Ja is the surface area (discharge range) that connects droplet centers 20 of the outermost periphery.

Figure 11:
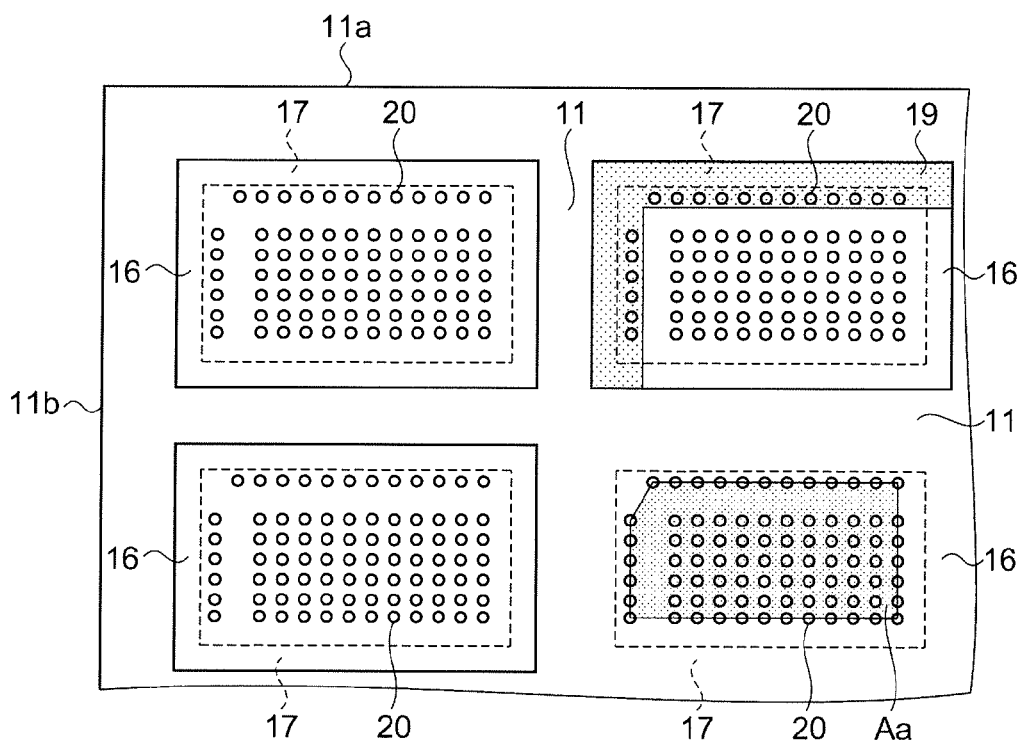
FIG. 11 is a schematic diagram showing the arrangement of the droplets deposited in the partitioned sections of the area A.

FIG. 11 is a schematic diagram showing the droplets deposited in the partitioned sections of the area A. The area A is an area having partitioned sections 16 positioned in a corner of the mother substrate 10A.

In the partitioned sections 16 of the area A, the portion of the partitioned sections near the dividing wall of the side near the external periphery of the mother substrate 10A tends to be even weaker liquid affinity. In other words, in FIG. 11, the portions along two sides inside the partitioned sections 16 are portions with weak liquid affinity 19. Based on this fact, droplets are discharged and fluid is coated so that the droplets of the outermost periphery are deposited near the dividing walls 11 of the two sides in the portions with weak liquid affinity 19 of the partitioned sections 16. The arrangement of the droplets is a shape in which the droplets at the outermost periphery in the two sides with weak liquid affinity are deposited nearer the dividing walls 11 in comparison with the droplet arrangement of the areas J.

Aa is the surface area (discharge range) that connects the droplet centers 20 at the outermost periphery. Accordingly, the surface area (discharge range) Aa is set so as to be greater than the surface area (discharge range) Ja that connects the droplet centers 20 at the outermost periphery of the areas J.

Figure 12:
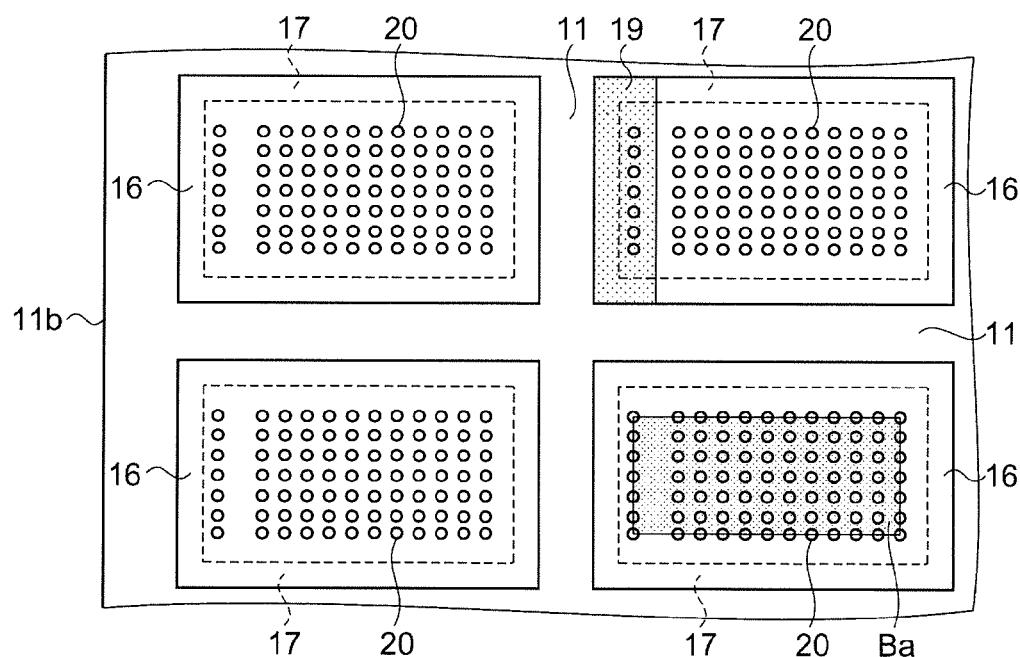
FIG. 12 is a schematic diagram showing the arrangement of the droplets deposited in the partitioned sections of the areas B.

FIG. 12 is a schematic diagram showing the droplets deposited in the partitioned sections of the areas B. The areas B are areas positioned to the side in the crosswise direction of the mother substrate 10A.

In the partitioned sections 16 of the areas B, the portions of the partitioned sections near the dividing walls of the side near the external periphery of the mother substrate 10A tend have even weaker liquid affinity. In other words, in FIG. 12, the portions along one side in the crosswise direction inside the partitioned sections 16 are portions with weak liquid affinity 19. Based on this fact, droplets are discharged and fluid is coated so that the droplets of the outermost periphery are deposited near the dividing walls 11 of the one side in the portions with weak liquid affinity 19 of the partitioned sections 16. The arrangement of the droplets is a shape in which the droplets at the outermost periphery in the one side with weak liquid affinity are deposited nearer the dividing walls 11 in comparison with the droplet arrangement of the areas J.

Ba is the surface area (discharge range) that connects the droplet centers 20 at the outermost periphery. Accordingly, the surface area (discharge range) Ba is set so as to be greater than the surface area (discharge range) Ja that connects the droplet centers 20 at the outermost periphery of the areas J.

Figure 13:
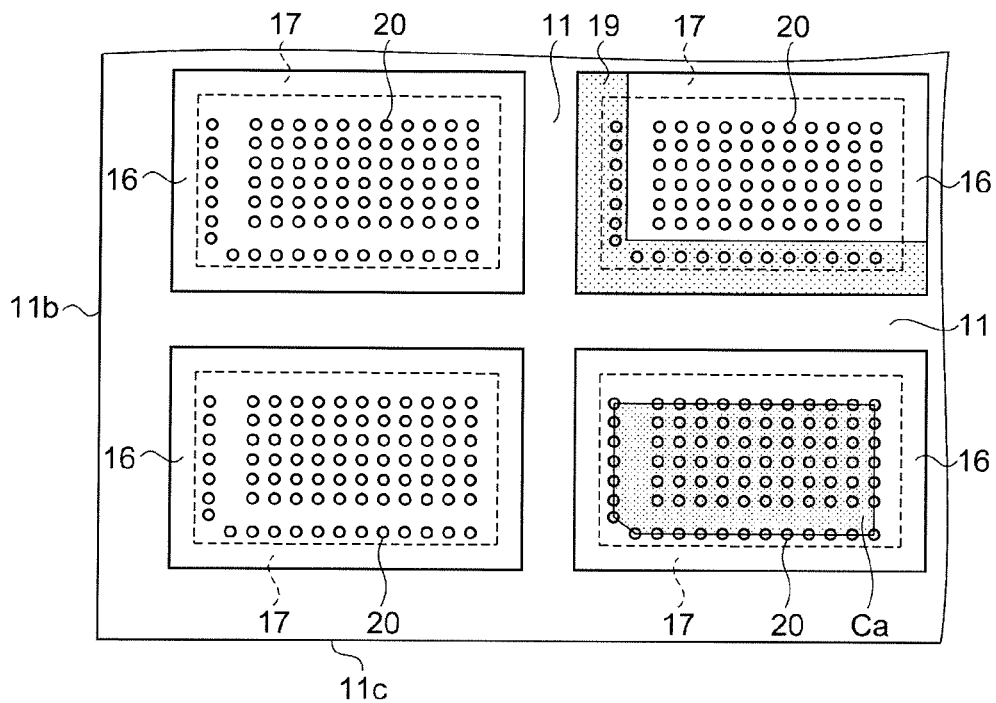
FIG. 13 is a schematic diagram showing the arrangement of the droplets deposited in the partitioned sections of the area C.

FIG. 13 is a schematic diagram showing the droplets deposited in the partitioned sections of the area C. The area C is an area positioned in a corner of the mother substrate 10A.

In the partitioned sections 16 of the area C, the portion of the partitioned sections near the dividing wall of the side near the external periphery of the mother substrate 10A tends to be even weaker liquid affinity. In other words, in FIG. 13, the portions along two sides inside the partitioned sections 16 are portions with weak liquid affinity 19. Based on this fact, droplets are discharged and fluid is coated so that the droplets of the outermost periphery are deposited near the dividing walls 11 of the two sides in the portions with weak liquid affinity 19 of the partitioned sections 16. The arrangement of the droplets is a shape in which the droplets at the outermost periphery in the two sides with weak liquid affinity are deposited nearer the dividing walls 11 in comparison with the droplet arrangement of the areas J. The arrangement of the droplets in the area C is an inverted arrangement along the centerline b (see FIG. 9) of the droplets in the area A.

Ca is the surface area (discharge range) that connects the droplet centers 20 at the outermost periphery. Accordingly, the surface area (discharge range) Ca is set so as to be greater than the surface area (discharge range) Ja that connects the droplet centers 20 at the outermost periphery of the areas J.

Figure 14:
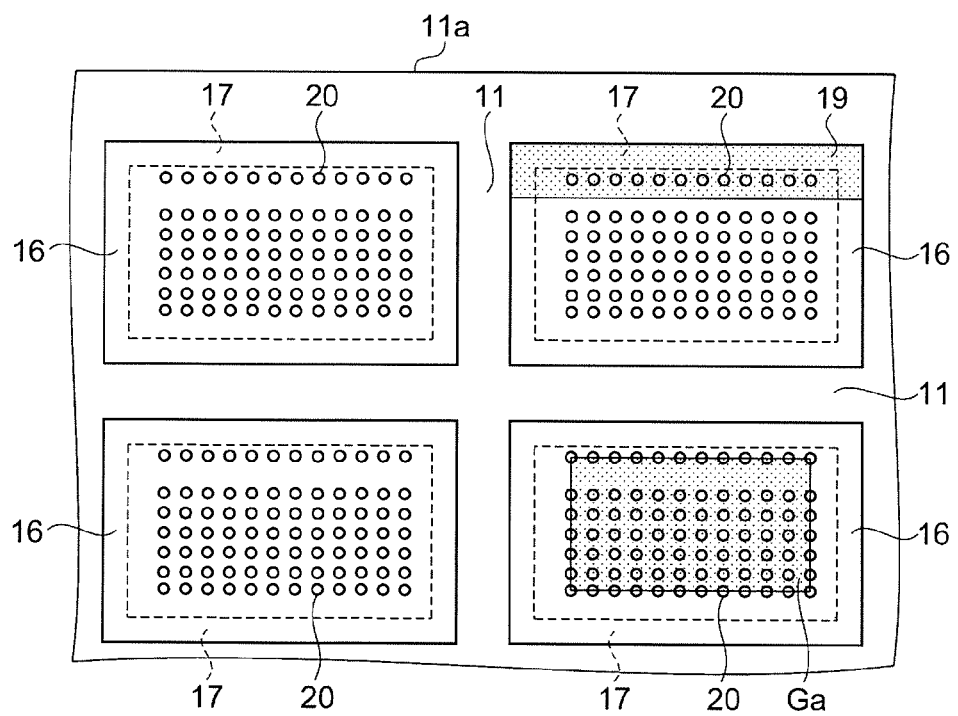
FIG. 14 is a schematic diagram showing the arrangement of the droplets deposited in the partitioned sections of the areas G.

FIG. 14 is a schematic diagram showing the droplets deposited in the partitioned sections of the areas G. The areas G are areas positioned to the side in the lengthwise direction of the mother substrate 10A.

In the partitioned sections 16 of the areas G, the portions of the partitioned sections near the dividing walls of the side near the external periphery of the mother substrate 10A tend have even weaker liquid affinity. In other words, in FIG. 14, the portions along one side in the lengthwise direction inside the partitioned sections 16 are portions with weak liquid affinity 19. Based on this fact, droplets are discharged and fluid is coated so that the droplets of the outermost periphery are deposited near the dividing walls 11 of the one side in the portions with weak liquid affinity 19 of the partitioned sections 16. The arrangement of the droplets is a shape in which the droplets at the outermost periphery in the one side with weak liquid affinity are deposited nearer the dividing walls 11 in comparison with the droplet arrangement of the areas J.

Ga is the surface area (discharge range) that connects the droplet centers 20 at the outermost periphery. Accordingly, the surface area (discharge range) Ga is set so as to be greater than the surface area (discharge range) Ja that connects the droplet centers 20 at the outermost periphery of the areas J.

The droplet arrangement used in the partitioned sections of the area D, the areas E, and the area F is an inverted arrangement along the centerline a of FIG. 9 of the droplets in the area A, the areas B, and the area C. Also, the arrangement of the droplets in the area H is an inverted arrangement along the centerline b in FIG. 9 of the droplets in the area G.

An example of discharging droplets in the areas B will be provided and the procedure for discharging droplets will be described in detail.

FIG. 15 is a schematic descriptive view showing the discharge procedure associated with the droplets of the partitioned sections in the areas B. The circle marks in the drawing indicate the droplet center. As described above, the partitioned sections 16 of the areas B have portions along one side (the side on the left side of the drawing) in the crosswise direction inside the partitioned sections 16 that are portions with weak liquid affinity 19. This one side matches the main scanning direction of the droplet discharge device.

First, droplets are discharged from three nozzles of a droplet discharge head in the crosswise direction of a single partitioned section along the outward path, as shown in FIG. 15(a). The droplets are discharged in succession in the direction of the arrows. Droplets are deposited in the portions with weak liquid affinity 19 using one of the three nozzles.

Next, droplets are discharged adjacent to droplets previously discharged along the return path, as shown in FIG. 15(b).

Droplets are thereafter discharged adjacent to previously discharged droplets along the outward and return paths, as shown in FIGS. 15(*c*) and 15(*d*). In this manner, droplets are deposited in the partitioned section 16.

In the partitioned sections 16 of the areas B, droplets are first deposited in the portions with weak liquid affinity 19, whereby the spreading of the droplets in this portion is assured, and droplets are thereafter deposited adjacent to the previously discharged droplets. Based on this fact, the arrangement of the droplets is close to the dividing walls, and additionally, droplets can be deposited with complete film coverage inside the partitioned sections 16 and without interfering with the spreading of the first droplet, even when droplets are discharged in an adjacent row and the droplets combine.

Modified Example of Droplet Arrangement

As an example, a droplet arrangement may be one such as that shown in FIG. 16 in the areas G in which droplet discharge carried out in predetermined intervals beginning from the portions with strong liquid affinity toward the portions with weak liquid affinity, and droplet discharge is repeated beginning from the portions with weak liquid affinity toward the portions with strong liquid affinity.

Figure 17:
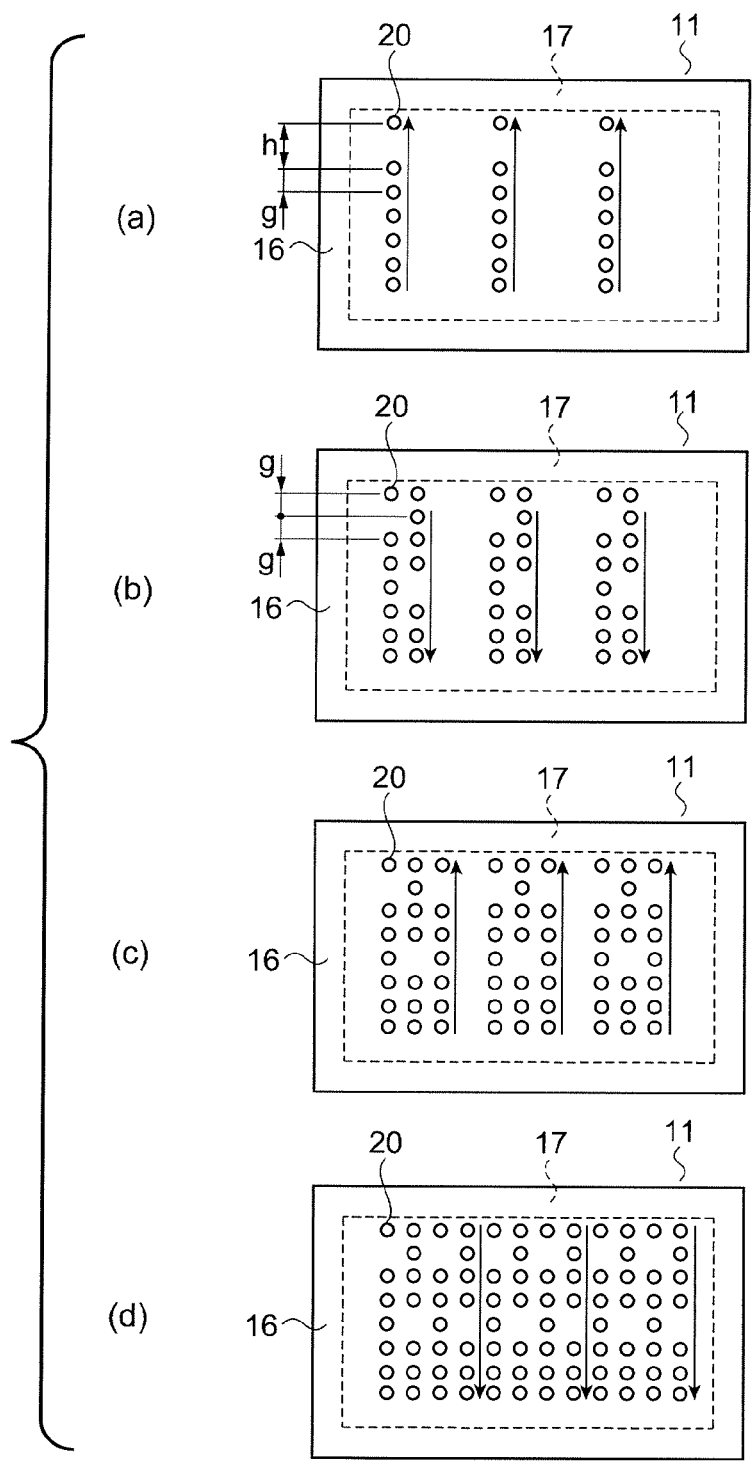
FIG. 17 is a schematic diagram describing the discharge procedure of the droplet arrangement of FIG. 16.

FIG. 16 is a schematic diagram showing another arrangement of the droplets deposited in the partitioned sections of the areas G. FIG. 17 is a schematic diagram describing the discharge procedure of the droplet arrangement of FIG. 16.

In the areas G, the portions along one side in the lengthwise direction inside the partitioned sections 16 are portions with weak liquid affinity 19. The difference from the droplet arrangement described in FIG. 13 is that droplets are deposited by skipping every other position in the secondary scanning direction of the droplet discharge device, within the interval h between each droplet produced by depositing the droplets of the outermost periphery near the dividing walls 11. In this manner, the interval changes from an interval g of the droplet centers 20 to a long interval h in a single row beginning from the portions with strong liquid affinity to the portions with weak liquid affinity, and in the other rows the interval g is continuous. Locations in which droplets are not deposited are provided in the vicinity of the center of a row in which droplets are deposited by skipping every other position, in order to adjust the droplet quantity coated inside the partitioned sections 16.

Discharge procedures of a droplet arrangement such as that described above will be described next.

Droplets are discharged using three nozzles of a droplet discharge head in the crosswise direction of a single partitioned section 16 along the outward path, as shown in FIG. 17(*a*). Droplet discharge is carried out in the direction of the arrows, and the final droplet discharge is carried out using a longer interval h than the interval g of the droplets up to that point. Here, a single droplet discharge is skipped to obtain the relationship h=2g.

Next, the droplets are discharged adjacent to previously discharged droplets on the return path, as shown in FIG. 17(*b*). At this time, droplet discharge is carried out in succession in equal intervals g, and droplets are discharged again in succession in the center section of the partitioned section 16 by way of locations in which droplets are not discharged.

Droplet discharge is thereafter carried out in the same manner as FIGS. 17(*a*) and 17(*b*), as shown in FIGS. (c) and 17(*d*).

In this manner, the interval between the droplet center on the outermost periphery and the droplet center of the single previous cycle is greater than the interval of other droplet centers in the case that the droplets are discharged beginning from portions with strong liquid affinity toward portions with weak liquid affinity in a single partitioned section.

The droplets discharged into the partitioned sections in the portions with strong liquid affinity wetten, spread, and sequentially join with the previously discharged droplets. The droplets that have landed in portions with weak liquid affinity spread poorly, are drawn to and join with previously discharged droplets, and are prevented from wetting and spreading beyond the portions with weak liquid affinity.

Accordingly, the interval between the droplet center on the outermost periphery and the droplet center of the single previous cycle is set to be greater than the interval of other droplet centers, whereby the droplets can be prevented from being drawn to and joining with previously discharged droplets, and the droplets can be deposited with complete coverage inside the partitioned sections.

Droplet discharge is carried out at equal intervals in portions with weak liquid affinity in the case that droplets are discharged beginning from portions with weak liquid affinity toward portions with strong liquid affinity. Since the droplets land and then poorly spread in the portions with weak liquid affinity, the droplets that have landed join together when deposited at equal intervals and the droplets can be deposited with complete coverage inside the partitioned sections.

When the droplet discharge step is completed, the fluid 15 coated in the partitioned sections 16 is subsequently solidified by heat drying or the like to carry out the solidification step for forming the coloring matter films 14 (step S14). Thereafter, a protective film 18 is formed on the dividing walls 11 and the coloring matter films 14 as required, as shown in FIG. 1. The method for forming the protective film 18 may be a method for coating a resin material by spin coating, or a method for forming an inorganic material by vapor deposition, sputtering, or the like.

The mother substrate 10A is cut and separated into individual color filters 1.

The color filters 1 can be manufactured via the above-described steps.

As described above, the method for manufacturing a color filter 1 as a film formation member of the present embodiment deposits droplets in partitioned sections 16 that are weaker liquid affinity than the partitioned sections with weak liquid affinity 16 so that the surface area connecting the droplet centers 20 of the droplets deposited in the outermost periphery inside the partitioned sections 16 is greater (the discharge range is wider). By adopting such a method, droplets can wetten and spread inside the partitioned sections 16 even in portions where the liquid affinity of the mother substrate 10A is weak and the droplets wetten and spread poorly. Excellent coloring matter films 14 can then be formed with complete coverage by solidifying the droplets of the fluid 15.

The droplets of the outermost periphery are deposited in positions near the dividing walls 11 on at least one side of the quadrangular partitioned sections 16, whereby the droplets discharged from the droplet discharge head 30 of the droplet discharge device 100 can be readily deposited and formed.

The droplets can wetten and spread inside the partitioned sections 16 by depositing the droplets of the outermost periphery in positions near the dividing walls 11 that correspond to portions with weak liquid affinity.

The surface area (discharge range) for connecting the droplet centers at the outermost periphery among the droplets deposited in the partitioned sections 16 positioned at the external peripheral edge portion of the mother substrate 10A is arranged to be greater (the discharge range is wider) than the surface area of the droplets deposited in other partitioned sections 16.

In this manner, the droplets wet and spread in the partitioned sections 16 in the case that the partitioned sections 16 positioned at the external peripheral edge portion of the mother substrate 10A are weak liquid affinity, and excellent coloring matter films 14 can be formed with complete coverage.

As described above, a method for manufacturing a color filter with complete coverage by the coloring matter films 14 can be provided in the present embodiment.

In the present embodiment described above, a color filter was described as an example of a film formation member, but no limitation is imposed thereby, and application can also be made to an EL (electroluminescent) light-emitting member, a silica glass precursor, metal compounds, and other electroconductive members, as well as dielectric members, and the like.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method for manufacturing a film formation member having a dividing wall provided on a substrate to form a plurality of partitioned sections with a film being formed within each of the partitioned sections by discharging a predetermined amount of liquid within each of the partitioned sections, the method comprising:
    identifying a position of at least one of the partitioned sections as a partitioned section with nonuniform liquid affinity; and
    discharging the liquid over a wider discharge range inside the partitioned section with nonuniform liquid affinity than a discharge range inside a partitioned section other than the partitioned section with nonuniform liquid affinity.

2. The method for manufacturing a film formation member according to claim 1, wherein
    the discharging of the liquid inside the partitioned section with nonuniform liquid affinity includes discharging the liquid at a position having a shorter distance to the dividing wall in at least one side of the partitioned section with nonuniform liquid affinity than a distance between a discharge position and the dividing wall in the partitioned sections other than the partitioned section with nonuniform liquid affinity, with each of the partitioned sections having a quadrangular shape.

3. The method for manufacturing a film formation member according to claim 2, wherein
    the discharging of the liquid inside the partitioned section with nonuniform liquid affinity includes discharging the liquid from portions with strong liquid affinity toward portions with weak liquid affinity within the partitioned section with nonuniform liquid affinity, and discharging the liquid in a position near the dividing wall for a longer interval than other section in the partitioned section with nonuniform liquid affinity.

4. The method for manufacturing a film formation member according to claim 2, wherein
    the discharging of the liquid inside the partitioned section with nonuniform liquid affinity includes discharging the liquid from portions with strong liquid affinity toward portions with weak liquid affinity within the partitioned section with nonuniform liquid affinity with the liquid being discharged in the portions with weak liquid affinity in equal intervals.

5. The method for manufacturing a film formation member according to claim 2, wherein
    the discharging of the liquid inside the partitioned section with nonuniform liquid affinity includes discharging the liquid from a portion that is weak liquid affinity and that is near the dividing wall.

6. The method for manufacturing a film formation member according to claim 2, wherein
    the identifying of the position of at least one of the partitioned section as the partitioned section with nonuniform liquid affinity includes identifying a portion in which a thickness of the liquid after discharge or a thickness of the film formed is less than a prescribed value as a portion with weak liquid affinity.

7. The method for manufacturing a film formation member according to claim 1, wherein
    the discharging of the liquid inside the partitioned section with nonuniform liquid affinity includes discharging the liquid from portions with strong liquid affinity toward portions with weak liquid affinity within partitioned section with nonuniform liquid affinity, and discharging the liquid in a position near the dividing wall for a longer interval than other section in the partitioned section with nonuniform liquid affinity.

8. The method for manufacturing a film formation member according to claim 1, wherein
    the discharging of the liquid inside the partitioned section with nonuniform liquid affinity includes discharging the liquid from portions with strong liquid affinity toward portions with weak liquid affinity within the partitioned section with nonuniform liquid affinity with the liquid being discharged in the portions with weak liquid affinity in equal intervals.

9. The method for manufacturing a film formation member according to claim 1, wherein
the discharging of the liquid inside the partitioned section with nonuniform liquid affinity includes discharging the liquid from a portion that is weak liquid affinity and that is near the dividing wall.

10. The method for manufacturing a film formation member according to claim 1, wherein
the identifying of the position of at least one of the partitioned section as the partitioned section with nonuniform liquid affinity includes identifying a portion in which a thickness of the liquid after discharge or a thickness of the film formed is less than a prescribed value as a portion with weak liquid affinity.

* * * * *